118,797

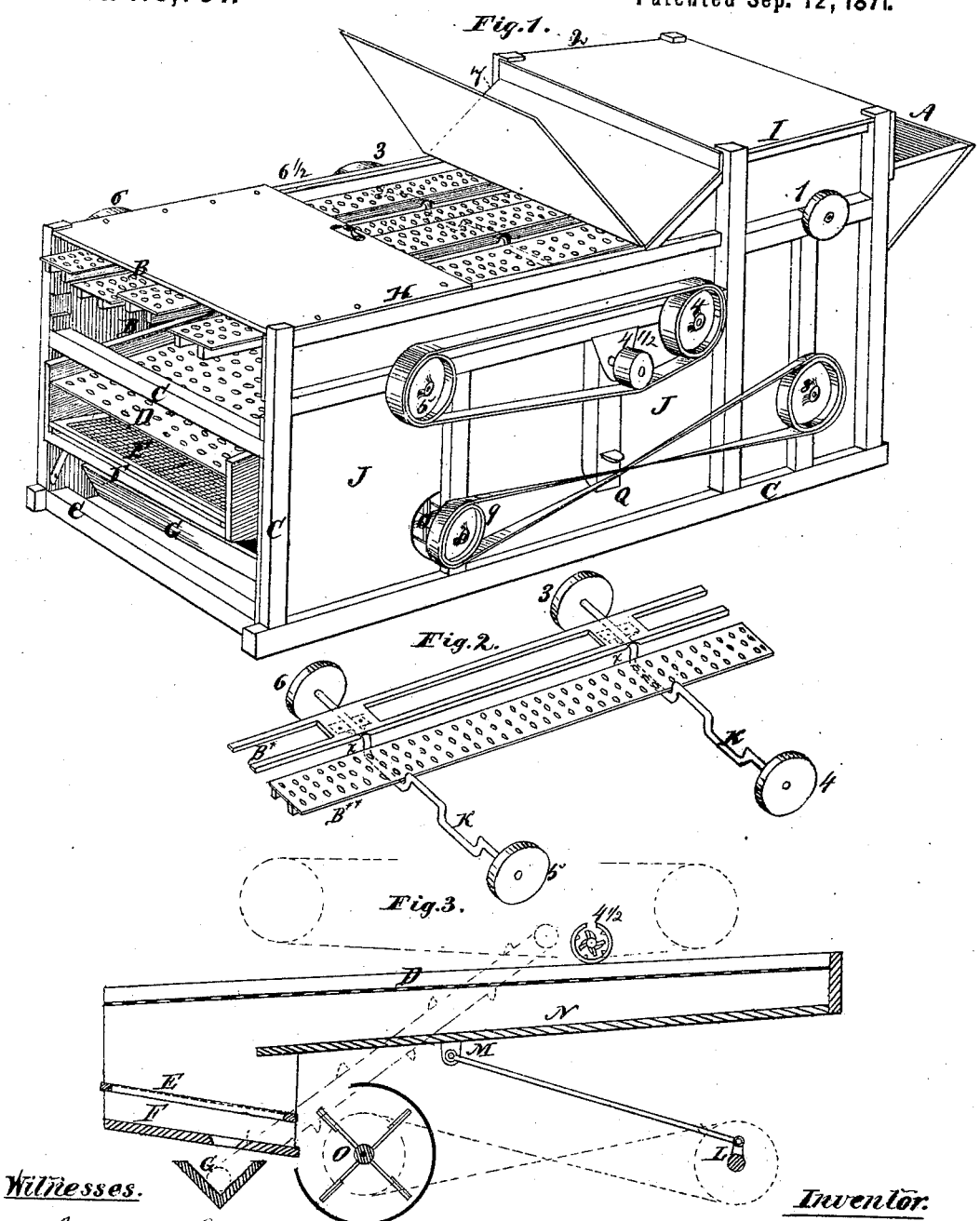

UNITED STATES PATENT OFFICE.

SAMUEL FILBY, OF LEWISTON, NEW YORK.

IMPROVEMENT IN MACHINES FOR THRASHING AND SEPARATING GRAIN.

Specification forming part of Letters Patent No. 118,797, dated September 12, 1871.

*To all whom it may concern:*

Be it known that I, SAMUEL FILBY, of the town of Lewiston, in the county of Niagara, in the State of New York, have invented certain Improvemets in Thrashing and Separator-Machines, of which the following is a specification:

My invention requires no change in the parts of those machines which thrash or shell the grain, nor in the use of the fanning-mill fans, nor the elevator; but my invention in part relates to elevating the barley, when that kind of grain is to be thrashed, into a contrivance through which said barley has its beards broken off the kernels without being passed a second time through the thrashing-cylinders, and hence with my plan the beards may be broken off the barley while the thrashing continues and without interference therewith. A most important feature in my invention is that, as soon as the straw, chaff, and grain leave the thrashing-cylinders, my method of carrying the straw begins immediately to shake it and effectually to separate the grain from it. Any chaff which may fall with the grain is again shaken by a riddle, which is ten or twelve feet in length, under which is a smooth inclined grain-board which catches the grain and conducts it upon the sieve in front of the fans.

Figure 1 is a perspective view of a completed machine. Fig. 2 is to show the peculiar construction of that portion of the machine which receives the straw, chaff, and grain from the thrashing-cylinders, and how while being carried the grain is shaken through it and separated from the straw. Fig. 3 is to show how the grain falls through the long riddle and is carried to the short sieve in front of the fans and these parts are operated.

At A is the front end of the machine where the unthrashed grain is fed into the thrashing-cylinders. At B B, Fig. 1, is the end where the straw and chaff are expelled. C is the frame. The two sides J are inclosed with boards upon the inside of the frame. The top is also covered. The height of the machine at I is about six feet, at H about four and one-half feet, and the width three and three-fourths feet. The power for running the machine is to be applied, by a belt, to pulley No. 1, which revolves the thrashing-cylinder. Upon the opposite end of this cylinder-shaft is pulley No. 2, from which motion is communicated by a belt to pulley 3 on the same shaft as pulley 4, which pulley, by another belt, communicates to pulley 5, thus giving motion to the straw-carriers and shakers B, as well as to pulley 6. Of these straw-carriers B there should be at least six, as shown in Fig. 1. They should be long enough to carry the straw from the thrashing-cylinder to the rear of the machine, at which place the straw-carriers in common use upon other machines may be attached, if desired. *B, Fig. 2, shows the wooden frame of one of these straw-carriers. **B shows the frame with a riddle upon it as when finished. At K K it is shown how each of the two shafts which work the straw-carriers and support them are constructed so as to give crank-like movements when revolved. At x x are shown how the straw-carriers are attached by iron boxes to said shafts. By the construction of these shafts and the position of the two carriers *B and **B it will be seen that, by revolving the shafts, one-half the number of the carriers will be rising upward and forward while the others (every other one) will go below the straw when returning backward; for the straw will rest on, or rather be moved by, the higher set of carriers. The amount of shaking given to the straw and grain will depend upon the length of the crank-turns in the shafts K K. About two inches of crank, giving a sweep of four inches, will be sufficient. The next motion is given by belt from pulley 6 to pulley 7 on the opposite end of same shaft as pulley 8. Pulley 7, being upon the right-hand side of the machine, is not shown in the drawing. The shaft of pulleys 7 and 8 has a crank-turn at its center L, which is connected by an iron rod to the bottom of inclined grain-board N at M. The inclined grain-board N and long riddle D, the short sieve E, and board F are firmly combined, and hence the turning of the shaft at L gives a backward-and-forward shake to said sieve and board. A motion of two or three inches may be sufficient.

The grain, it may now be observed, is first separated from the straw by the shaking straw-carriers B B. It then falls, with more or less chaff, upon the riddle D, which is to be so hung or supported that the shaking and its descending position will cause the grain and chaff to move to the front of the fans O, the grain all along the riddle D separating and dropping upon the inclined grain-board N, thence running upon the sieve F, and running into the grain-box G. At O, Fig. 3, are the fanning-mill fans, upon the shaft of which is pulley 9, Fig. 1, revolved by belt from pulley 8.

In thrashing barley the grain-box G is to be inclined so as to cause the barley to run to the end of the box to the right-hand side of the machine, where the barley is taken up by an elevator, (made of tin or sheet-iron cups fastened upon a band, such as is in common use,) which empties the barley into the end of a toothed cylinder, in which revolves a toothed shaft, upon which shaft the pulley $4\frac{1}{2}$, Fig. 1, is hung, and which is revolved by the band from pulley 4. This cylinder and shaft I call the "barley-beard breaker." It extends across the machine. Its location is shown at *$4\frac{1}{2}$, Fig. 3. The teeth or breakers are set wormingly, so as to crowd the barley from the right-hand side of the machine into the spout Q, where it is delivered as shown. If desired, the barley-beard breaker may be set declining to the left, to allow the barley to run into the spout Q. The elevator is carried around a pulley at each end of it, and at the upper end the pulley $6\frac{1}{2}$ is extended so as to have motion given to it by band running from pulley 6 to pulley 7.

If the top of the machine be covered, as shown in the drawing at H, Fig. 1, care must be taken to have room enough above the straw-carriers so that the straw will be carried freely.

The dimensions of the pulleys or other parts of the machine and a proper adjustment of the parts need not be more specifically described, as these things will be understood by persons skilled in these matters.

I claim as my invention—

The crank-shafts K K, straw-carriers and shakers B B, riddle D, inclined grain-board N, sieve E, and breaker $4\frac{1}{2}$, when said parts are constructed, combined, and arranged to operate substantially as and for the purposes described.

SAMUEL FILBY.

Witnesses:
JACOB HENNING,
S. B. ESHELMAN.